N. ANDERSON.
TIRE ARMOR.
APPLICATION FILED MAY 8, 1913.
1,086,696.  Patented Feb. 10, 1914.
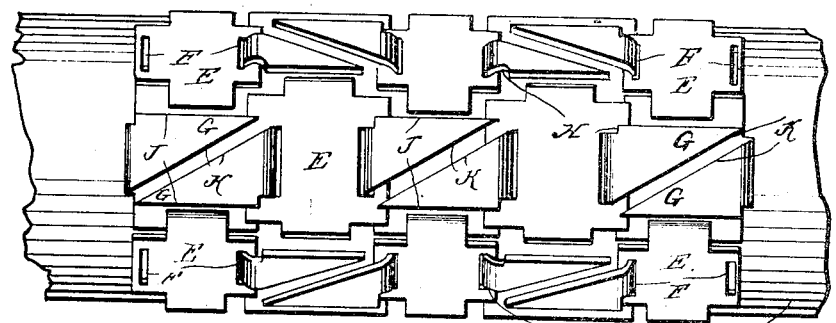
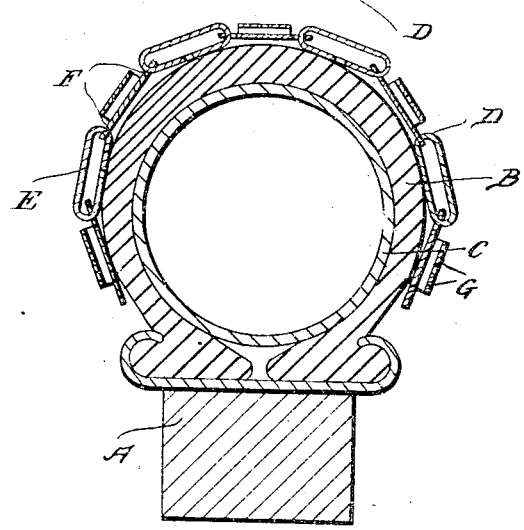
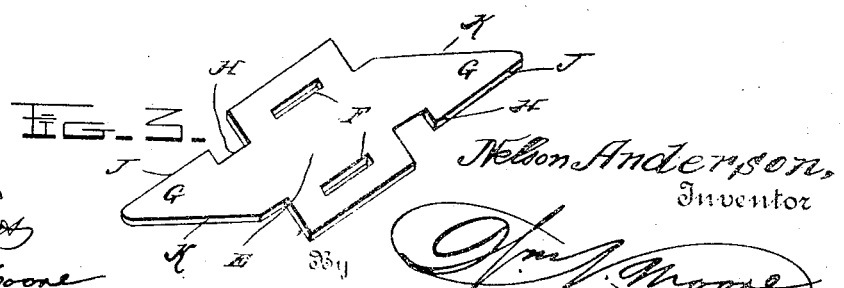
Nelson Anderson, Inventor

UNITED STATES PATENT OFFICE.

NELSON ANDERSON, OF BALLSTON SPA, NEW YORK.

TIRE-ARMOR.

1,086,696.  Specification of Letters Patent.  Patented Feb. 10, 1914.

Application filed May 8, 1913. Serial No. 766,316.

*To all whom it may concern:*

Be it known that I, NELSON ANDERSON, a citizen of the United States, residing at Ballston Spa, in the county of Saratoga and State of New York, have invented certain new and useful Improvements in Tire-Armors, of which the following is a specification.

My invention relates to improvements in tire armors, particularly designed to protect the tire and to prevent slipping of the tire.

The object of my invention is the provision of an armor or protector for the tire which can be easily applied and which while sufficiently flexible or accommodating in its action will positively prevent the tire from skidding or slipping upon the ground or surface, thus insuring a proper protection to the tire and preventing accidents.

Another object of my invention is the provision of a tire armor which will withstand the hard usage to which it will be subjected and which will be comparatively inexpensive of production and thoroughly efficient and practical in every particular.

With these objects in view my invention consists of a tire armor embodying novel features of construction and combination of parts substantially as disclosed herein.

Figure 1 is a plan view of a portion of a tire showing a part of my armor or protector applied to the tire. Fig. 2 is a transverse sectional view taken on the line X—X of Fig. 1, and Fig. 3 is a perspective view of one of the members or sections of which my tire armor is composed.

In the drawings the letter A, designates the rim, B, the tire and C, the inner tube, my armor D, being shown in position for use upon the tire in Figs. 1 and 2.

The novelty of my invention resides in the peculiar construction of the sections or members which comprise the armor, the section being clearly shown in Fig. 3, and comprising the main body portion E, of rectangular shape and provided with a pair of slots F, and from opposite sides of the body portion extends the pair of tongues G, formed on opposite sides with the recesses H, and having a straight edge J, and an inclined edge K, the sections when put together to form the complete flexible armor being arranged as shown most clearly in Fig. 1.

It will be observed that the pair of tongues on one section is adapted to pass through the slots in the opposite sections, which causes the sections to interlock or overlap and also causes the recesses upon the opposite faces of the tongues to form an engaging or interlocking arrangement with the contiguous section. It will also be noticed that when the sections are united to provide the armor that the pair of tongues and the flat faces of the sections are disposed alternately which gives the proper surface to the armor to cause said armor to bite into or grip the surface to prevent slipping or skidding upon such surface. It will thus be seen that I provide an armor which completely covers and protects the tire, which is sufficiently flexible or accommodating in its action, which presents a proper biting or engaging surface, which holds the parts or sections in proper relation and which in every particular is reliable and practical.

It will be understood that my armor covers the entire tire and may be secured in any desired manner and that the armor in addition to preventing slipping or skidding prevents the tire from being punctured and thus adds greatly to the life and usefulness of the tire.

I claim:

Tire armor comprising a multiplicity of interengaged links each link comprising a body portion having lateral extensions provided with oppositely disposed slots, and a pair of oppositely disposed pointed tongues having each a straight and an inclined edge and said tongues having recesses on opposite sides, said slots in the lateral extensions receiving the tongues of adjacent links with said recesses thereof finding a shouldered bearing and an interlocking engagement with the material of the extensions adjacent the slots.

In testimony whereof I affix my signature in presence of two witnesses.

NELSON ANDERSON.

Witnesses:
  KATE E. GAFFNEY,
  MORGAN E. WELSH.

Copies of this patent may be obtained for five cents each, by addressing the "Commissioner of Patents Washington, D. C."